United States Patent [19]

Sink

[11] Patent Number: 4,478,324
[45] Date of Patent: Oct. 23, 1984

[54] RESILIENT DRIVE MEANS FOR A CLUTCH

[75] Inventor: William H. Sink, Auburn, Ind.

[73] Assignee: Dana Corporation, Toledo, Ohio

[21] Appl. No.: 368,265

[22] Filed: Apr. 14, 1982

[51] Int. Cl.³ .................. F16D 13/52; F16D 13/68
[52] U.S. Cl. ........................ 192/70.17; 192/70.2;
 192/30 V; 192/70.19
[58] Field of Search ............. 192/70.16, 70.17, 70.18,
 192/70.19, 70.2, 30 V, 48.8; 188/71.5, 218 A

[56] References Cited

U.S. PATENT DOCUMENTS

| | | | |
|---|---|---|---|
| 3,345,109 | 10/1967 | Petersen et al. | 192/70.16 |
| 3,424,288 | 1/1969 | Sink | 192/70.16 |
| 3,642,101 | 2/1972 | Havth | 192/70.17 |
| 3,829,162 | 8/1974 | Stimson et al. | 301/6 A |

FOREIGN PATENT DOCUMENTS 1500516 7/1969 Fed. Rep. of Germany ... 192/30 V

Primary Examiner—Rodney H. Bonck
Assistant Examiner—James J. Merek
Attorney, Agent, or Firm—Emch Schaffer & Schaub

[57] ABSTRACT

A clutch comprising a flywheel and one or more axially extending driving friction disks is provided. The pressure plate of the clutch is resiliently urged into engagement with at least one of the friction disks. A resilient driving means extends from the flywheel to drive a plate engaging means located adjacent the friction disks. The driving means engages the engaging plate means and acts as a vibration and tumbling arresting means to reduce wear and noise encountered during the operation of the clutch.

8 Claims, 4 Drawing Figures

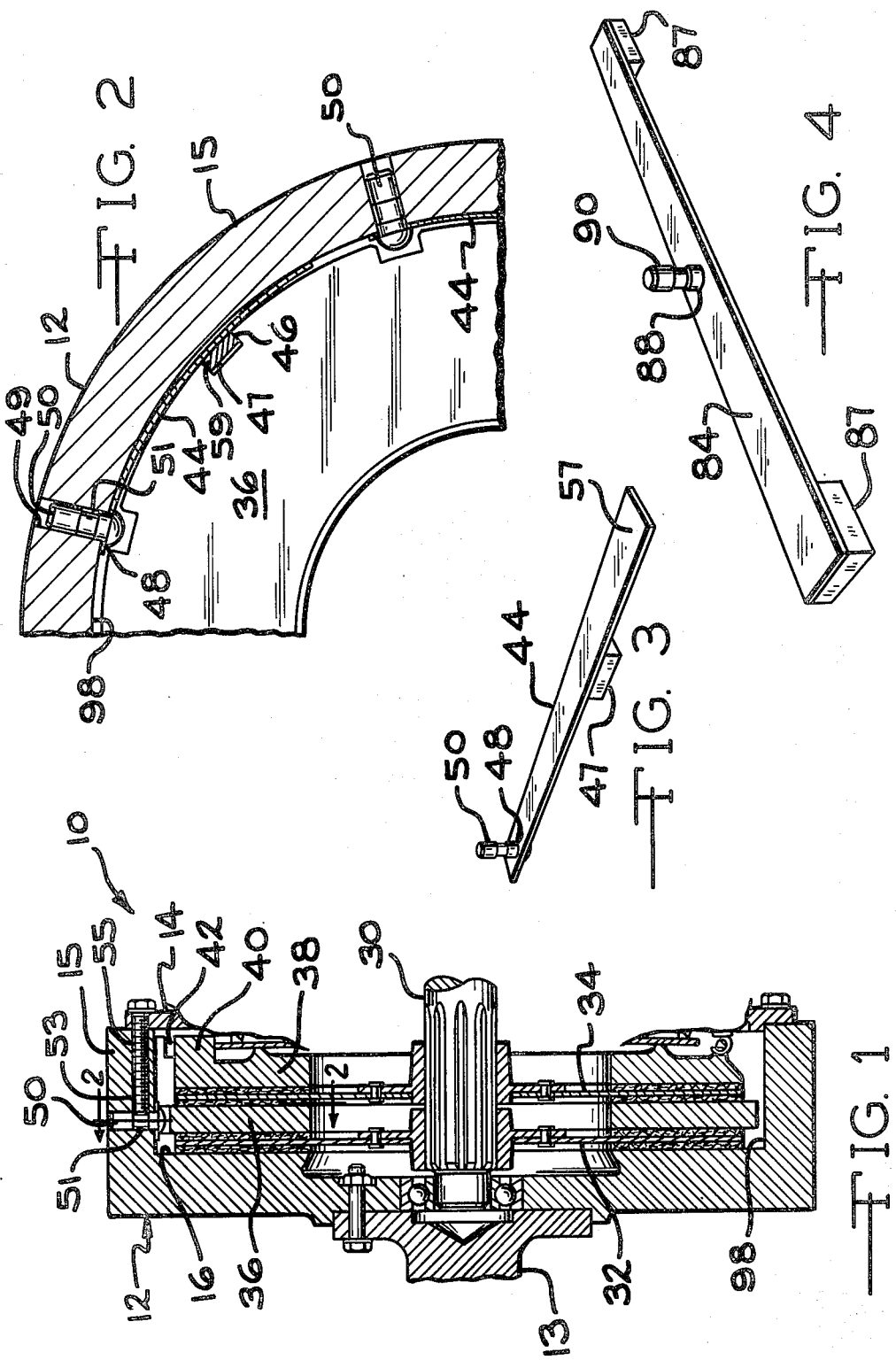

RESILIENT DRIVE MEANS FOR A CLUTCH

BACKGROUND OF THE INVENTION

Heavy duty clutches, generally, and specifically those of the two-plate configuration, are subject to tumbling and torsional activity of their parts at idle speed and torsional activity at higher speeds when the clutch is released. In such arrangements the intermediate plate of the two-plate clutch or the pressure plate of a single-plate clutch have a tendency to tumble at slow speed and a tendency to clatter or vibrate back and forth at high speed as the edges of its drive lugs abut against the opposite edges of the drive lug slots. The first of these motions (tumbling) is caused by gravity. In this movement the lug slots on the intermediate or pressure plate seek support from horizontally opposed pairs of driving lugs, which pair of lugs constantly change in relative position during rotation, imparting a tumbling motion to the intermediate or pressure plate. The second of these motions is caused by a torque loading being imposed on the intermediate plate through a non-uniform rotation of the engine, flywheel, and cover. At the same time the intermediate or pressure plate is attempting, due to inertia, to rotate uniformly. The rotational differences between the intermediate plate and the flywheel creates a torque loading on the intermediate plate. The torque loading can produce a vibratory motion in the intermediate plate that can cause the clutch to clatter.

The unwanted tumbling and vibratory motion cause a "clunking" type noise in the clutch and, additionally, subject the clutch parts to undue wear. Although wearing can be provided for fairly satisfactorily by use of strengthened structural members, recent developments in the engine field now provide much quieter running engines. This improvement in engines has rendered the intermediate or pressure plate torsional and tumbling caused noise an objectionable factor at engine idle conditions.

Although various arrangements for the suppression of tumbling, vibrations and rattling of clutch plates and clutch assemblies have been developed and are known to exist in the prior art, none of the known arrangements provide an extremely simple assembly which requires the use of no special mounting means and, therefore, is capable of utilizing standard clutch parts. Accordingly, it would be desirable to provide a clutch useable with the new engines that has a simply mounted drive means for the intermediate plate which also acts as a vibration suppression unit to reduce the noise generated by the operation of the clutch, and the resulting wear.

SUMMARY OF THE INVENTION

The invention is directed to a driving means for a clutch device. The clutch has a rotatable drive member having a circular flange. A driven member is positioned adjacent the drive member. An engaging plate means is provided that is rotatable with and axially moveable relative to the drive member. The engaging plate means has an outer periphery containing at least one slot. A resilient member is connected to the circular flange of the drive member and extends between the circular flange and the outer periphery of the engaging plate means. A drive block is positioned on the resilient member. The drive block is disposed for engaging the slot in the engaging plate means whereby the drive block drivingly connects the engaging plate means to the drive member.

DESCRIPTION OF THE DRAWINGS

FIG. 1 is a partial cross sectional view of the clutch device of the present invention.

FIG. 2 is a partial cross sectional view taken along line 2—2 in FIG. 1.

FIG. 3 is a perspective view of the resilient drive means for the clutch of the present invention.

FIG. 4 is a perspective view of another embodiment of the spring means of the present invention.

DESCRIPTION OF THE PREFERRED EMBODIMENT

Referring now to the drawings for a better understanding of the invention, there is shown a spring loaded two-plate clutch 10 drivingly connected for unitary rotation with a flywheel 12. The flywheel has a substantially planar friction face 16 and a circular flange 15 that extends from the outer periphery of the friction face. The flywheel 12 is rotatably supported on a driving shaft 13 that extends from an engine or prime mover (not shown). The flange 15 extends axially from the outer periphery of the flywheel 12 in a direction away from or rearwardly of the driving shaft 13. A clutch cover 14 is secured to the circular flange 15.

An output shaft, shown fragmentarily at 30, adapted to be clutched into a driving relationship with the flywheel 12, is piloted at its forward end in the flywheel and extends axially rearwardly therefrom through the cover 14. A pair of driven members 32 and 34 are splined for unitary rotation and relative axial movement on the forward end of shaft 30 and are adapted to be pressed into driving engagement with the flywheel 12 and a limited axially moveable intermediate plate 36 disposed there between. Movement of the driven members and the intermediate plate is controlled by an axially moveable pressure plate 38. Pressure plate 38 is drivingly connected to the cover 14 by means of a plurality of lugs 40 extending axially from the rear surface thereof into registering slots 42 formed in the cover 14. The circular flange 15 extends over and radially encompasses the driven members, the intermediate plate and the pressure plate. The intermediate plate 36 is drivingly connected to the flywheel by means of a plurality of substantially flat resilient members 44 that are connected to the circular flange 15 of the flywheel 12. The resilient members are normally made of a spring steel and the members are wider than the intermediate plate 36. The resilient members 44 have an aperture 48 in one end. A pin or shaft 50 is positioned in the aperture 48 of each member. The pin extends through the member into an aperture 49 in the circular flange 15 to secure one end of the member to the circular flange. The pin 50 can be adapted with a groove 51 that is located on the portion of the pin that extends into the circular flange 15. The groove 51 is disposed to be in alignment with a threaded aperture 53 in the circular flange. A bolt 55 passes through the clutch cover 14 and threadingly engages the aperture 52 to secure the clutch cover to the circular flange. The bolt can be constructed to extend into the aperture far enough to engage the groove 51 in the pin 50 to lock the pin 50 in the aperture 49 in the circular flange 15.

Each resilient member 44 extends from the pin 50 in a circumferential direction between the circular flange and the intermediate plate. The resilient member includes a drive block 47 which is positioned on the side of the resilient member facing the intermediate plate 36. The drive blocks are positioned substantially at the midpoint of the resilient members and are disposed for registering in drive slots 46 formed on the outer periphery of the intermediate plate 36. The drive slots 46 are positioned axially in the intermediate plate and the sidewalls 59 of the drive slots are substantially perpendicular to the friction face 16 of the flywheel 12. Preferably, the drive slots 46 are uniformly spaced around the outer periphery of the intermediate plate 36, and there is one drive slot for registration with each drive block 47.

The resilient members 44 are substantially flat, as shown in FIG. 3, prior to being positioned in the clutch 10. In the clutch the resilient members must bend into an arcuate shape to extend between the circular flange 15 and the intermediate plate 36. The portion of the resilient member adjacent the pin 50 is in contact with the circular flange 15. The portion of the resilient member adjacent the drive block 47 is in contact with the intermediate plate 36. The end 57 of the resilient member opposite the pin 50 is in contact with the circular flange. In this manner the resilient members resiliently engage the intermediate plate 36. In addition, the resilient members also resiliently urge the drive blocks 47 into engagement with the drive slots 46 in the intermediate plate 36.

The intermediate plate 36 is drivingly coupled to the flywheel 12 by the resilient members 44 and drive blocks 47 which engage the drive slots 46. The intermediate plate is drivingly coupled with the output shaft 30 whenever the driven members 32 and 34 are moved into frictional engagement with the flywheel and the intermediate plate. During the clutching and declutching of the clutch 10, the intermediate plate 36 moves axially approximately thirty to forty thousandths of an inch.

The mechanism for engaging and disengaging the clutch devices is substantially the same as that described in U.S. Pat. No. 3,424,288 granted to William H. Sink on Jan. 28, 1969. As the mechanism for operating the clutch device is described in detail in this earlier patent, that description will not be repeated herein. However, the disclosure of the above patent is hereby incorporated by reference into the specification of the present patent application.

Because of the torque loading imposed on the intermediate plate 36, a clutch constructed as herein described suffers from the before mentioned clattering noise and consequent increase in wear on the moving parts. To prevent the above difficulties, the resilient members 44 are positioned between the inner periphery 98 of the circular flange 15 of the flywheel and the outer periphery of the intermediate plate 36.

The resilient members 44 resiliently engage the intermediate plate 36. Although any number of resilient members 44 can be utilized in the present invention, there is usually a resilient member associated with each aperture in the circular flange 15. As mentioned, the resilient members 44 and drive slots 46 are uniformly spaced around the outer periphery of the intermediate plate 36. Thus, the resilient members 44 act to resiliently center the intermediate plate 36 relative to the circular flange 15 of the flywheel. As the resilient members are wider than the intermediate plate 36, the resilient members will remain in resilient engagement with the intermediate plate as the intermediate plate moves axially with respect to the shaft 30. It should be noted, however, that the spring force of the resilient members 44 against the intermediate plate 36 is sufficient to prevent disengagement of the clutch 10.

The operation of the clutch, including the resilient member 44 will now be explained in greater detail. When the engine is in an idle condition, tumbling of the intermediate plate 36 can occur. This tumbling is resisted by the resilient members 44 that engage the inner periphery 98 of the circular flange 15 of the flywheel 12 and the outer periphery of the intermediate plate 36. The resilient members 44 resiliently engage the intermediate plate 36 and act to center the intermediate plate with respect to the circular flange 15. As the intermediate plate 36 is centered with respect to the circular flange 15, the intermediate plate is much less susceptible to gravitational forces that result in tumbling. Accordingly, the resilient members effectively reduce or eliminate the objectionable tumbling of the intermediate plate when the engine is idling. At the same time, the resilient members 44 resiliently bear against the intermediate plate 36 and the circular flange 15 of the flywheel 12 to reduce or eliminate torsional vibration or rattle between the drive blocks 47 and drive slots 46. When the engine speed is increased substantially above idle conditions (approximately to 1100 r.p.m.) centrifical force on the intermediate plate 36 tends to prevent tumbling. The resilient members 44 then function to provide resilient engagement between the circular flange 15 and intermediate plate 36 to prevent torsionally caused vibration or clattering.

During the operation of the clutch 10, it is desirable to prevent the drive blocks 47 from coming into contact with the circular flange 15 of the flywheel 12. The drive blocks are normally constructed of a very hard material such as steel to reduce wear between the drive blocks 47 and the drive slots 46 in the intermediate plate. However, the circular flange 15 of the flywheel is normally constructed of a relatively soft material such as cast iron. Accordingly, contact between the drive blocks 47 and the circular flange 15 can frequently have a very damaging result on the circular flange. The resilient members 44 are positioned between the drive blocks 47 and the circular flange 15 and provide a wear surface that prevents engagement between the drive blocks and the circular flange. This wear surface prevents damage from resulting to the circular flange due to contact between the drive blocks and the circular flange. In addition, it is possible to construct the resilient members 44 of a material that can more easily handle the wear induced by contact with the drive block than the soft cast iron of the circular flange 15 of the flywheel 12.

FIG. 4 shows another embodiment of the present invention. In this embodiment a substantially flat resilient member 84 is shown. An aperture 88 is located in substantially the center of the resilient member. A pin 90 is positioned in the aperture 88. The pin extends from the resilient member for engagement with and aperture in the circular flange 15 as previously described. In this manner the resilient member 84 can be secured to the circular flange. On each end of the resilient member there is positioned a drive block 87. The drive blocks are positoned on the side of the resilient member that faces the intermediate plate 36. The drive blocks 87 are disposed for engaging drive slots 46 in the outer periphery of the intermediate plate. The resilient member 84 acts to resiliently drive and resiliently position the intermediate plate 36 as previously described. However, since the resilient member 84 contains two drive blocks 87 fewer resilient members are required to resiliently drive the intermediate plate.

Having described the invention in detail with reference to the drawings, it is understood that such specifications are given for the sake of explanation. Various modifications and substitutions, other than those cited, can be made without departing from the scope of the invention as defined in the following claims.

I claim:
1. Driving means for a clutch device comprising:
   a drive member having a circular flange, said circular flange containing at least one aperture;
   a driven member;
   an engaging plate means rotatable with and axially moveable relative to the drive and driven members, said engaging plate means having an outer periphery containing at least one slot;
   a resilient member connected to said circular flange, said resilient member extending between said circular flange and said outer periphery of said plate engaging means, one end of said resilient member containing a pin that extends from said resilient member, said pin disposed for extending into and securely engaging said aperture in said circular flange, said resilient member being secured to said circular flange by said pin, said end of said resilient member adjacent said pin being in contact with said circular flange, said portion of said resilient member being adjacent a drive block and being in contact with said engaging plate means, said end of said resilient member spaced opposite said pin being in contact with said circular flange, whereby said resilient member reduces torsional and tumbling induced rattle in said clutch device; and
   said drive block being positioned on said resilient member said block disposed for engaging said slot in said engaging plate means whereby said drive block drivingly connects said engaging plate means to said drive member.
2. The driving means of claim 1 wherein said drive block is positioned substantially at the midpoint of said resilient member.
3. The driving means of claim 1 wherein said resilient member is made of spring steel.
4. The driving means of claim 1 wherein said resilient member and said drive block is wider than said engaging plate means to maintain said drive block in engagement with said slot during axial movement of said engaging plate means.
5. The driving means of claim 1 wherein said engaging plate means contains a plurality of slots and a plurality of resilient members connected to said circular flange, said drive blocks extending from said resilient member for engaging said slots in said engaging plate means, whereby said resilient members act to center said engaging plate means with respect to said circular flange to reduce torsional and tumbling induced rattle.
6. The driving means of claim 5 wherein said resilient members are connected to said circular flange at the midpoint of said members, a drive block being positioned at each end of said members for engaging slots in said engaging plate means.
7. The driving means of claim 1 wherein two spaced apart driven members are provided, said engaging plate means being positioned between said driven members.
8. Driving means for a clutch device comprising:
   a drive member having a circular flange, a plurality of apertures disposed in said flange;
   two spaced apart driven members positioned for axial movement relative to said drive member;
   an engaging plate means positioned between said two driven members, said engaging plate means rotatable with and axially moveable relative to said drive member, said engaging plate means having an outer periphery containing a plurality of uniformly spaced slots;
   a plurality of substantially flat resilient members positioned between said circular flange and said engaging plate means, said resilient members extending circumferentially about said outer periphery of said engaging plate means, one end of each of said resilient members containing a pin that extends from said resilient members, said pins being disposed for extending into and securely engaging said apertures in said circular flange, said resilient members being securely connected to said circular flange by said pins; and
   a drive block positioned on said side of said resilient members adjacent said engaging plate means, said drive block positioned at substantially the midpoint of said resilient members, said drive blocks disposed for engaging said slots in said engaging plate means whereby said drive blocks drivingly connect said engaging plate means to said drive member, said drive blocks engaging said engaging plate means to center said engaging plate means with respect to said circular flange to reduce torsional and tumbling induced rattle in said clutch.

* * * * *